US009531801B1

(12) United States Patent
Cantrell et al.

(10) Patent No.: US 9,531,801 B1
(45) Date of Patent: Dec. 27, 2016

(54) DYNAMIC INFORMATION TECHNOLOGY MULTI-DIRECTIONAL MULTI-PROTOCOL RESOURCE CONVERGENCE SYSTEM

(75) Inventors: Mark Cantrell, Cumming, GA (US); Chris Chapman, Suwanee, GA (US); Robert Russo, Alpharetta, GA (US)

(73) Assignee: Virtual Command, LLC, Atlanta, GA (US)

( * ) Notice: Subject to any disclaimer, the term of this patent is extended or adjusted under 35 U.S.C. 154(b) by 236 days.

(21) Appl. No.: 13/567,800

(22) Filed: Aug. 6, 2012

Related U.S. Application Data

(60) Provisional application No. 61/529,014, filed on Aug. 30, 2011.

(51) Int. Cl.
| G06F 15/16 | (2006.01) |
| G06F 15/173 | (2006.01) |
| H04L 29/08 | (2006.01) |
| H04W 92/18 | (2009.01) |

(52) U.S. Cl.
CPC .......... H04L 67/104 (2013.01); *H04L 67/14* (2013.01); *H04L 67/16* (2013.01); *H04W 92/18* (2013.01)

(58) Field of Classification Search
CPC .. H04L 67/104; H04L 67/107; H04L 67/1059; H04L 61/30; H04L 67/14; H04L 67/16; H04W 88/04; H04W 8/005; H04W 92/01
USPC .............. 709/217, 218, 219, 223, 225, 227, 228, 709/229, 249
See application file for complete search history.

(56) References Cited

U.S. PATENT DOCUMENTS

| 6,708,217 B1 * | 3/2004 | Colson ............... H04L 67/2823 709/203 |
| 6,990,513 B2 * | 1/2006 | Belfiore ................... G06F 9/54 707/E17.005 |
| 7,080,159 B2 * | 7/2006 | Chu .......................... G06F 8/20 709/220 |
| 7,685,252 B1 * | 3/2010 | Maes .................... G06F 9/4443 709/217 |
| 8,204,969 B2 * | 6/2012 | Carcerano ................. G06F 8/65 709/202 |
| 2002/0129126 A1 * | 9/2002 | Chu .......................... G06F 8/20 709/220 |
| 2003/0055898 A1 * | 3/2003 | Yeager .................... G06F 9/544 709/205 |
| 2003/0229900 A1 * | 12/2003 | Reisman ........... G06F 17/30873 725/87 |

(Continued)

OTHER PUBLICATIONS

"Self Service Portal, Hypervisor, Hypervisors, Access : Abiquo"; Web pages from www.abiquo.com; accessed on Jul. 10, 2012; 32 pgs.

(Continued)

*Primary Examiner* — Edward Kim
(74) *Attorney, Agent, or Firm* — Taylor English Duma LLP

(57) ABSTRACT

A software platform preferably delivered via the internet provides access to and from web-enabled devices with the purpose of delivering and providing software applications, hardware resources, reporting, monitoring, tracking, virtual and cloud computing augmentation, all through a cross-end point unified user-based interface. Resources can be connected dynamically to other resources through the platform and, depending upon the decision of the user and the security settings, resources of the end-point device can be provided to other members in the same network.

17 Claims, 15 Drawing Sheets

(56) References Cited

U.S. PATENT DOCUMENTS

| | | | | |
|---|---|---|---|---|
| 2004/0030794 A1* | 2/2004 | Hugly | ............... | H04L 63/02 |
| | | | | 709/230 |
| 2004/0088347 A1* | 5/2004 | Yeager | ............ | H04L 67/104 |
| | | | | 709/202 |
| 2006/0020704 A1* | 1/2006 | Balasuriya | ....... | G06F 17/30899 |
| | | | | 709/227 |
| 2008/0086564 A1* | 4/2008 | Putman | ............. | H04L 29/06 |
| | | | | 709/227 |
| 2009/0319672 A1* | 12/2009 | Reisman | ......... | G06F 17/30873 |
| | | | | 709/227 |
| 2009/0320073 A1* | 12/2009 | Reisman | ......... | G06F 17/30873 |
| | | | | 725/51 |
| 2010/0332456 A1* | 12/2010 | Prahlad | .......... | G06F 17/3002 |
| | | | | 707/664 |
| 2010/0332818 A1* | 12/2010 | Prahlad | .......... | G06F 17/3002 |
| | | | | 713/150 |

OTHER PUBLICATIONS

"ChannelCloud—Designed by the Channel for the Channel"; Web pages from www.channelcloud.com; accessed on Jul. 10, 2012;9 pgs.

"OS33: The Fully Hosted IT Automation Platform"; Web pages from www.os33.com; accessed on Jul. 10, 2012; 62 pgs.

* cited by examiner

Software Switch Virtual Server Components

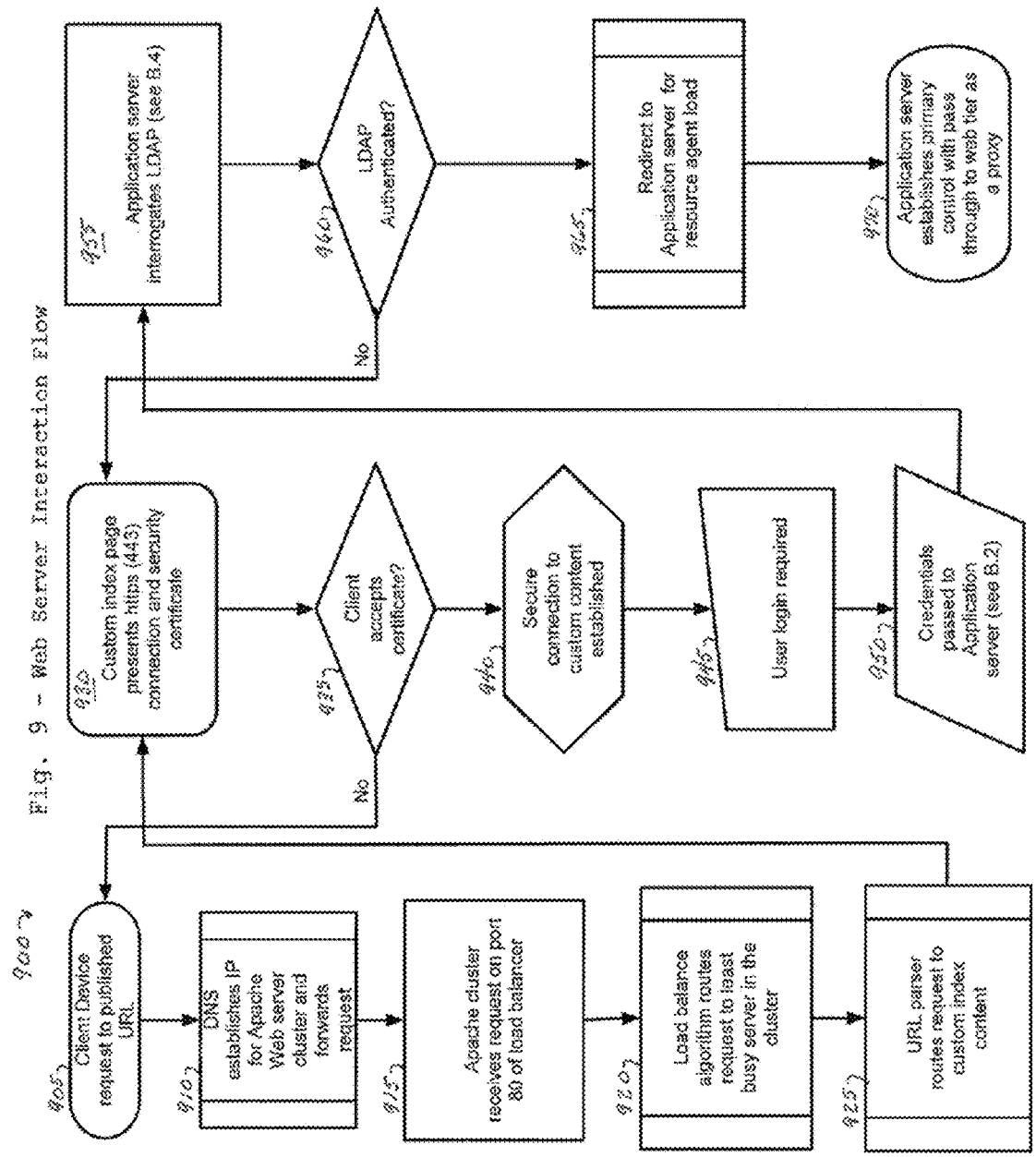

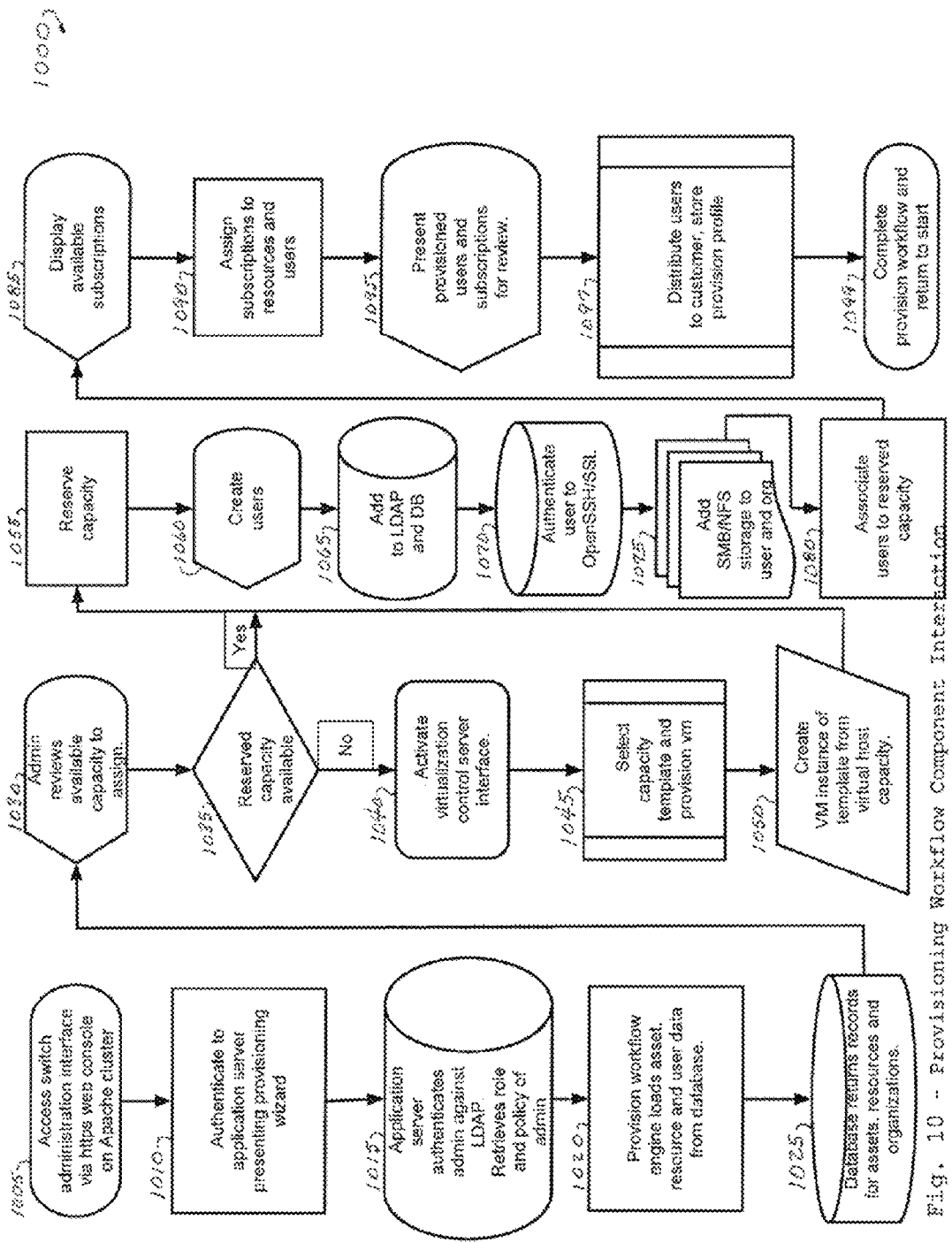
Fig. 10 - Provisioning Workflow Component Interaction

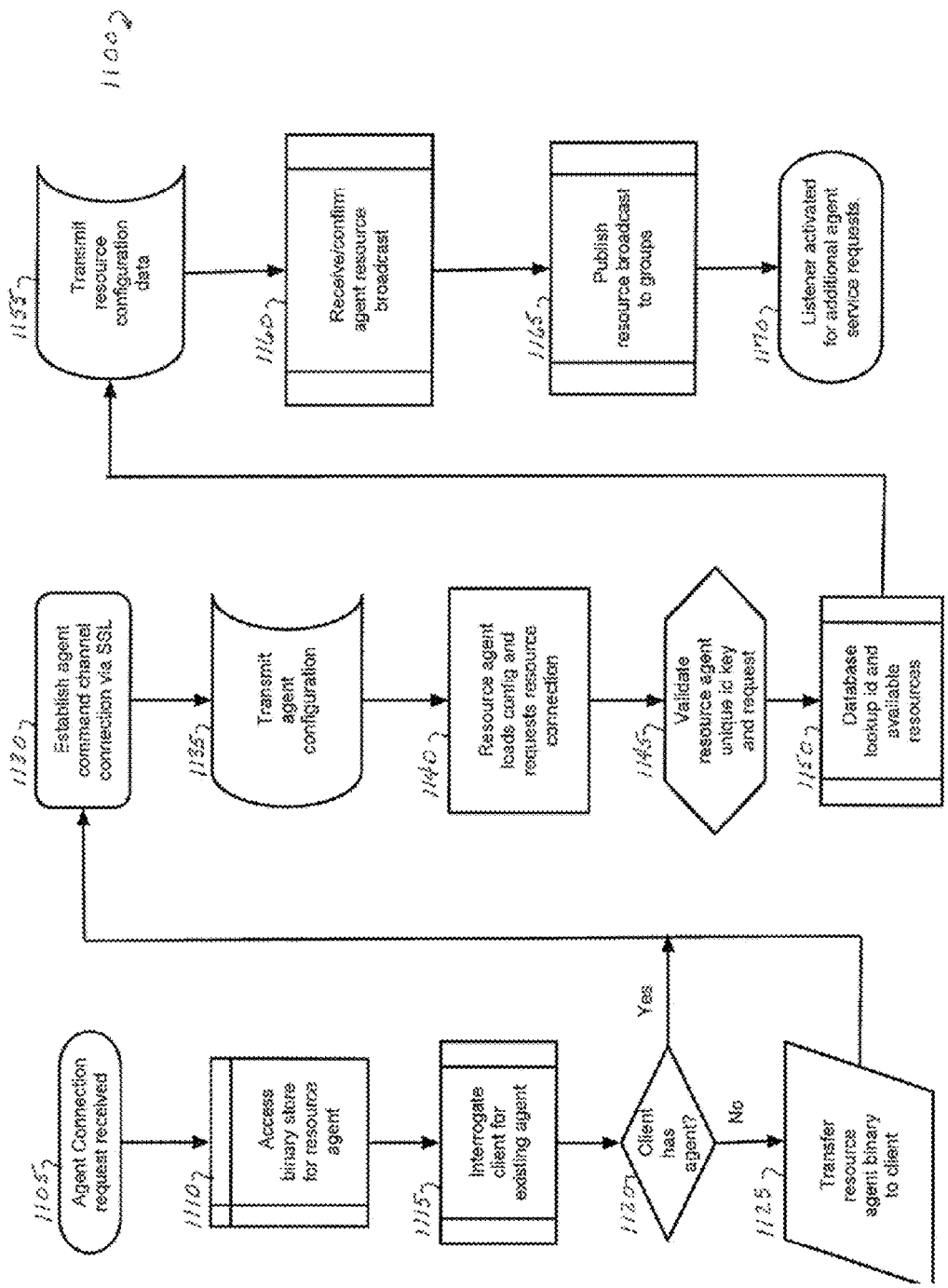
Fig. 11 - Application Server Resource Agent Load

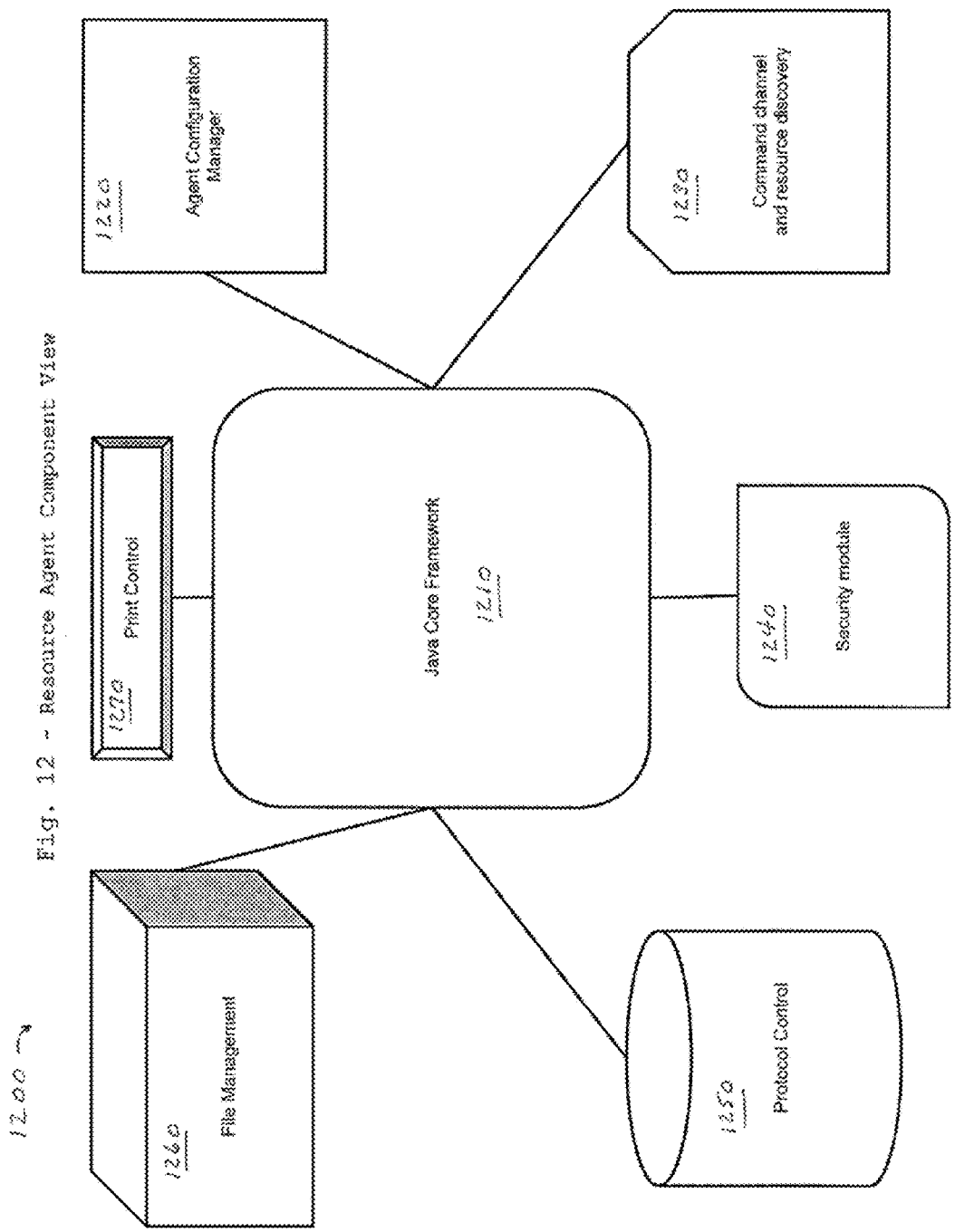

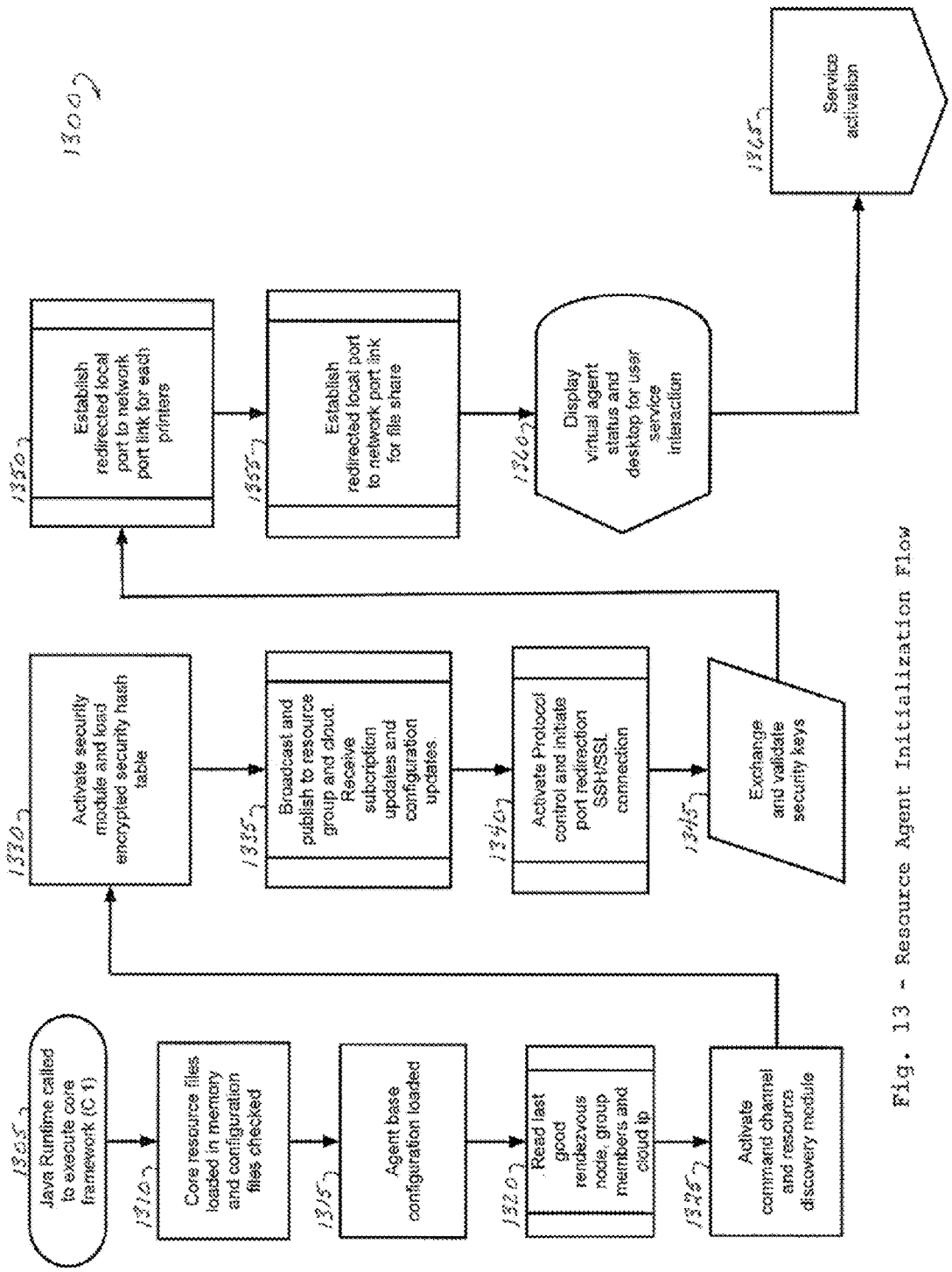
Fig. 13 - Resource Agent Initialization Flow

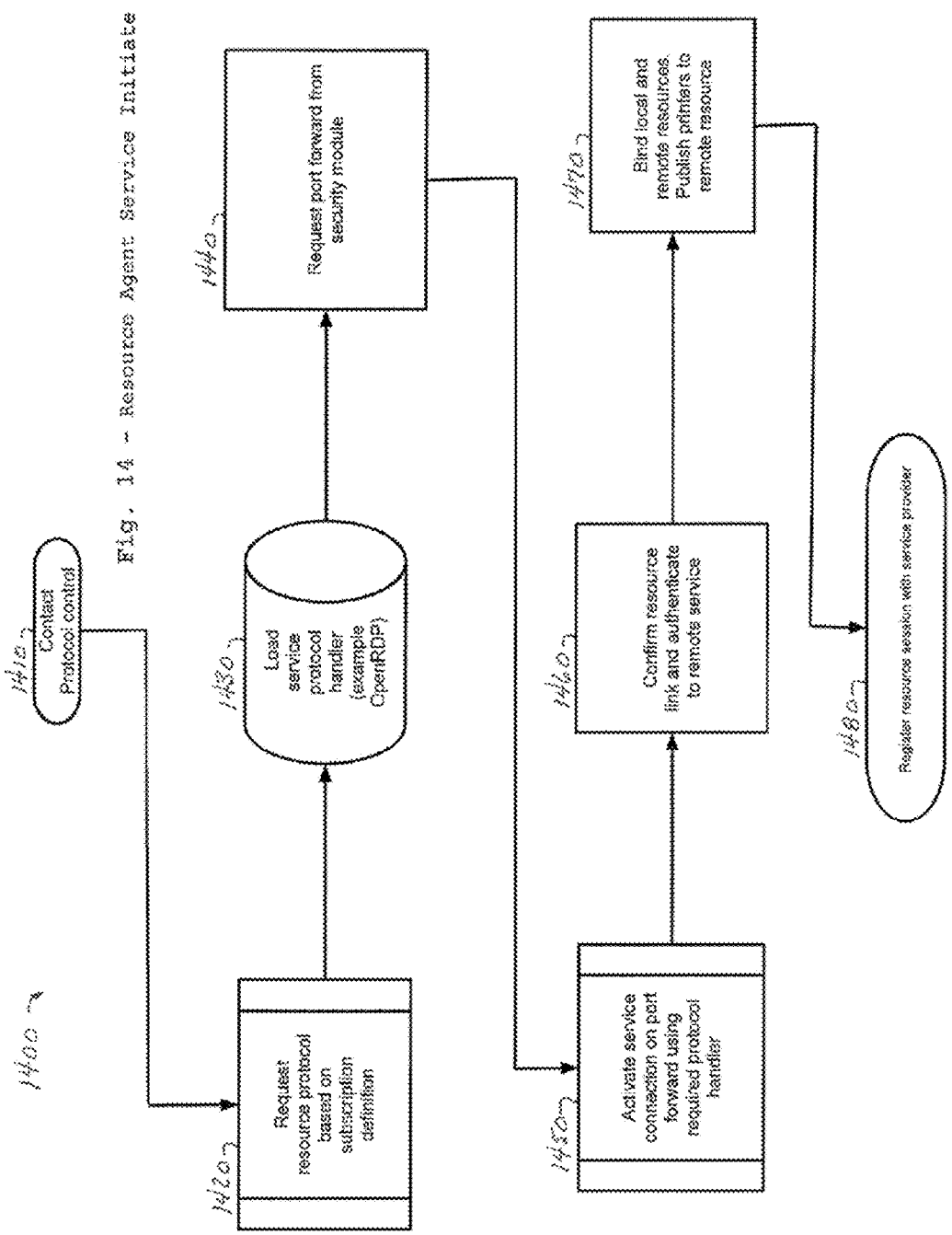

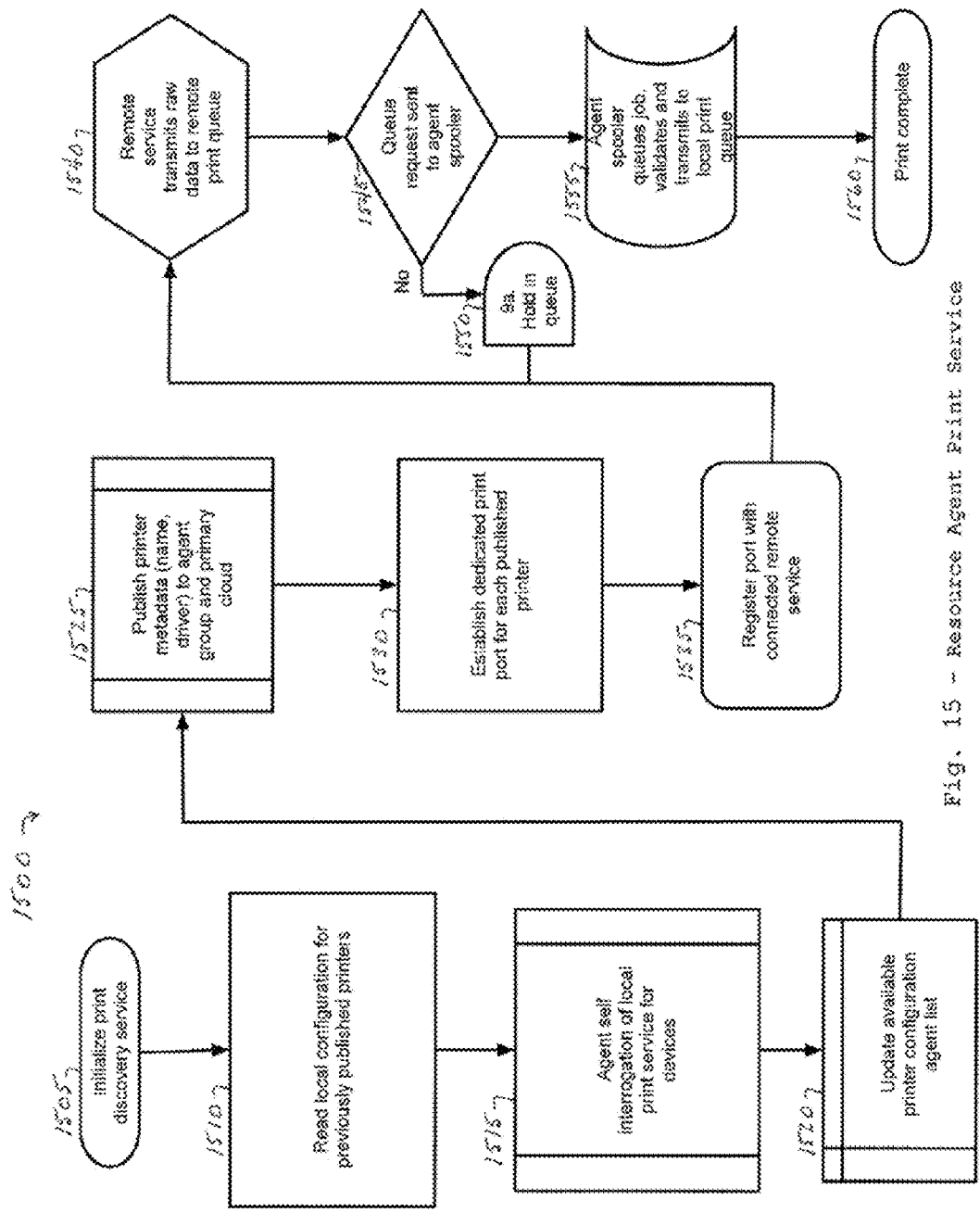
Fig. 15 - Resource Agent Print Service

DYNAMIC INFORMATION TECHNOLOGY MULTI-DIRECTIONAL MULTI-PROTOCOL RESOURCE CONVERGENCE SYSTEM

REFERENCE TO RELATED APPLICATIONS

This application claims priority to U.S. Provisional Application No. 61/529,014, filed Aug. 30, 2011, which is hereby specifically incorporated by reference herein in its entirety.

TECHNICAL FIELD

The subject matter of the present disclosure pertains, generally, to cloud computing and software-as-a-service ("SaaS"); and, more particularly, to a software platform and agent architecture that converges information and technology resources into a dynamic, peer-associated computer network overlay of assets.

BACKGROUND

In an increasingly complex, computerized, and interconnected world, users require access to an increasingly diverse number and type of resources, both software and hardware alike. The advancing sophistication of users, their respective work product, and their varied tools require, in turn, sophisticated systems in order to support interoperability and the associated productivity increases expected of such sophisticated systems.

In fact, the number, types, and models of hardware devices have proliferated in the present consumer-demand oriented economy. Similarly, diverse operating systems, user interfaces, communication and network transfer protocols, file formats, low and high level system and user software resources, and the like, are now widely in use. Further compounding the complexity and expense of interoperable computer systems are broadly varying, constantly changing, scalable, and unpredictable network topographies.

Adding complexity and significant expense to this technological backdrop, network administrators must be increasingly cautious and concerned regarding the scope and context of user access to software and hardware resources. They must remain vigilant regarding user security, and the security of stored and transmitted information, their network, and its associated infrastructure and resources. Accountability and traceability concerns are never ending. User and network support, administrative demands, and information technology costs are steadily and unendingly increasing.

Notwithstanding the sophisticated and demanding user environment, coordinating, configuring, securing, and interconnecting network resources, and providing efficient and reliable user access thereto, has continued to be both expensive and elusive.

For example, in some environments, protocols such as RDP are used to interconnect one or more personal or client computing devices to, most often, a network server. Such systems have inherent limitations. The computing devices must all be Windows® and terminal services protocol capable. There must be an established network or gateway server. All client computing devices must have an RDC client installed thereon. All data and information must be directed through the same RDP protocol. All computing devices must be administered with Windows® tools and licensing. Generally speaking, such a configuration is not considered ideal for purposes of client computing device sharing, support, or security.

Alternatively, in some environments, software tools such as LogMeIn®, GoToMyPC®, or the like, are used to interconnect a single personal or client computing device to another single computing device or network server. As above, such systems suffer with inherent limitations. Point-to-point protocols are used to share a single desktop. Accordingly, there is no multi-tenant (multi-user) capability. Such systems are designed, for the most part, as a support and collaboration tool, such as sharing a desktop via the Internet, and not as an application or service delivery system. As above, all data and information travel through the same protocol. Sharing of control and resources to another user and/or computing device ties up or limits the host computing device. In essence, such systems might be thought of as a software replacement for device-to-device virtual private networking ("VPN").

There are systems which provide virtual infrastructure management, such as Citrix® and VMWare®. Such systems provide users with access to a virtualized computing environment, wherein the operating system, with associated applications and devices, is pre-configured to provide a user experience matching that of a local desktop computing session. Disadvantageously, in such environments, the user cannot reach beyond his or her defined computing configuration to access other applications, devices, and the like, which may exist within the organization's infrastructure, but to which no pathway for access has been established.

Further, there are systems which operate in a SaaS model. Such systems enable applications to be published from a cloud-based platform to an array of users. Again, disadvantageously, such systems merely supplement a user's local desktop computing session, providing access to additional or other software applications than a user might be able to access locally. Still, however, the user cannot reach beyond his or her defined computing configuration to access other applications, devices, and the like, which may exist within the organizational or cloud infrastructure, but to which no pathway for access has been established.

To date, there is no known system or technology available that allows cross-connection and/or interconnection of diverse personal computing devices, network servers, data, applications, services, and/or the like. Such a system would be desirable in order to provide users with convenient, secure, and defined levels of access to any available hardware computing device, such as, by way of non-limiting example, personal computing devices running any of a variety of operating systems, peripheral and other hardware devices, and to services, applications, data, and the like, without limitation. Such a system should provide for multi-tenant capabilities wherein multiple users, devices, software, services, and the like, may be interlinked, but would not interfere with each other. Such a system should make use of the best and most appropriate protocol(s) for the required task, and should have the ability to make use of diverse, yet appropriate, protocols for different required services. For example, such a system might make use of WebDAV or FTP protocols for file transfer, HTTP(S) for Internet traffic, RDP, VNC, VRDP, or TCP for application access, and the like. Such a system should be access and support friendly, should be appropriate for single or multi-user desktop sharing, and should support application publishing and data transfer. Users should be able to securely access available resources without taking over control of the host computing device and/or host environment.

Accordingly, it is to the provision of such a desirable system and technology that the present inventive subject matter is directed.

SUMMARY

The computer system and methods described herein address the aforementioned shortcomings in the prior art and provide a software platform, preferably delivered via the Internet, but which could also be delivered via wide area network, local area network, and/or non-permanent streaming connections, and an agent architecture, together providing access to and from network-capable and/or network-enabled computing devices with the purpose of delivering and providing software applications, hardware resources, reporting, monitoring, tracking, virtual and cloud computing augmentation, all through a cross-end point unified user-based interface. Resources can be connected dynamically to other resources through the platform and, depending upon the decision of the user and the security settings, resources of the end-point device can be provided to other members in the same network. Accordingly, the software platform and agent architecture converges information and technology resources into a dynamic, peer-associated computer network overlay of assets.

In order to provide such functionality and associated benefits, the agent architecture provides a cross-device platform, low foot-print interface that allows a multi-directional network link to be established from the device to a web-based platform and other agent-enabled devices within the peer group. The software platform provides an aggregation point for devices to form independent groups of managed networks, as well as centralized resource access to public and private services linked to the software platform.

The software platform and agent architecture may be blended through a unified, customizable graphic interface that provides a device transferrable, single, web-based or native view of all resources, services, and connections.

The subject matter of the present systems and methods described herein is believed to provide numerous advantages over prior art network frameworks and cloud computing platform processes. For example, the software platform of the present disclosure does not require the end device to be of a specific operating system or computing power; rather, the software platform adapts to use the available resources of the end device. Further advantageously, the agent architecture provides multiple types of connectivity to and from each resource, wrapped in layers of security, and further providing reporting functionality so that any individual device can access a broad group of devices and services.

The end point agent allows local, remote, and cloud-based services to be accessed from a single interface as though they were one consistent computing platform. The agent architecture can, therefore, leverage existing technologies on devices, and adapt them for use with the platform. The platform combines multiple technology components into one consistent interface and technology system.

Thus, a hardware-agnostic environment is provided by the system of the present disclosure, wherein resource connectivity is at the center of the inventive architecture. Advantageously, such architecture does not require a conventional, prior art datacenter or network architecture for deployment or support. In some embodiments, the platform may be deployed via a relatively simple, software-based switch.

The software platform effectively lowers the cost and complexity in deploying and configuring SaaS, virtualization, remote access, device interfacing, communication, security auditing, and information technology ("IT") resource management.

A practical example of the ease and flexibility of the resource agent and software platform is its ability to provide a small business office with remote access, mobile access, storage, virtualization, applications on-demand to employees, all with role and policy control, secure auditing of each device and user accessing the system, end-point devices, such as printers, scanners, and other devices, and resource sharing and monitoring through a single interface.

The agent can be dynamically deployed to all of a company's resources and may, subsequently, interlink all of these devices locally, through the web, and to third-party cloud computing and/or service providers. As the business grows and changes, resources are quickly added with one technology platform through a self-service interface, requiring little-to-no integration as compared to known, competing technologies, all of which require multiple components to be managed and integrated by a trained IT staff or third-party IT vendor.

In addition to the aforedescribed benefits and attributes, the subject matter of the present disclosure provides numerous other benefits over known, existing systems. For example, the agent, in addition to being highly device-adaptable, can integrate new and existing technologies without the need for reinstalling or resource modification. Local device resources can be service-enabled and securely shared directly with other devices through dynamic, user publish and subscribe controls. Features and services can be automatically added to a device interface through the agent, all without the need for complex deployment and configuration management. Additionally, data, application, and user interactions can be accounted for and reported in consolidated views for easy management of services by administrators.

BRIEF DESCRIPTION OF THE DRAWINGS

The summary, as well as the following detailed description, is further understood when read in conjunction with the appended drawings.

In the drawings:

FIG. 9 is a diagrammatic representation of a web server interaction flow in which the present disclosure and/or portions thereof may be implemented;

FIG. 10 is a diagrammatic representation of a provisioning workflow and component interaction flow in which the present disclosure and/or portions thereof may be implemented;

FIG. 11 is a diagrammatic representation of an application server resource agent load flow in which the present disclosure and/or portions thereof may be implemented;

FIG. 12 is a diagrammatic representation of a resource agent component view structure in which the present disclosure and/or portions thereof may be implemented;

FIG. 13 is a diagrammatic representation of a resource agent initialization flow in which the present disclosure and/or portions thereof may be implemented;

FIG. 14 is a diagrammatic representation of a resource agent service initiate flow in which the present disclosure and/or portions thereof may be implemented; and FIG. 15 is a diagrammatic representation of a resource agent print service flow in which the present disclosure and/or portions thereof may be implemented.

Figure 1:
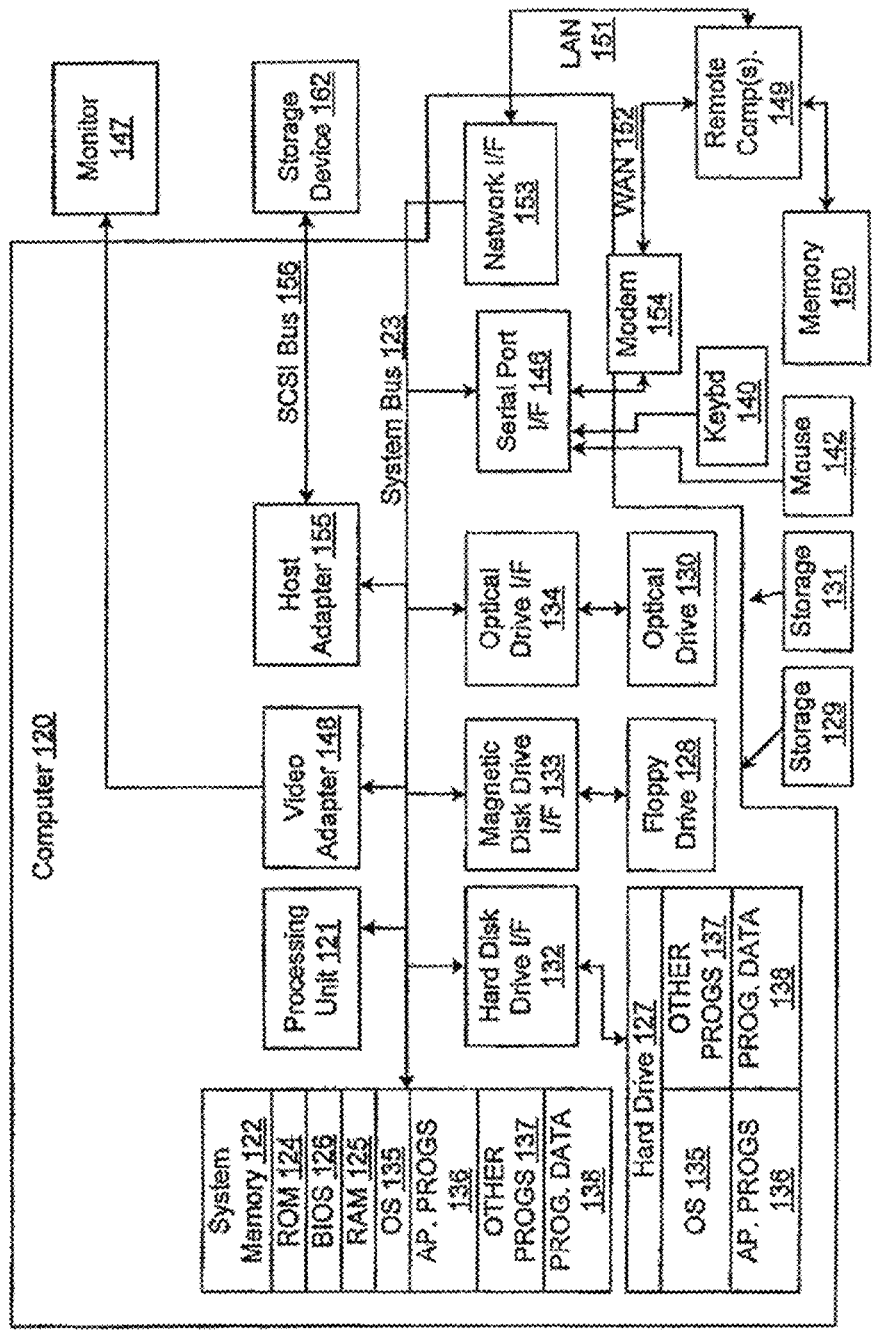
FIG. 1 is a diagrammatic representation of a computing environment in which the present disclosure and/or portions thereof may be implemented.

It is to be noted that the drawing Figures presented are intended solely for the purpose of illustration and that they are, therefore, neither desired nor intended to limit the subject matter of the disclosure to any or all of the the specific methods, structures, flows, frameworks, systems, and/or devices disclosed, except insofar as they may be deemed essential to the disclosure.

DETAILED DESCRIPTION OF ILLUSTRATIVE EMBODIMENTS

The present disclosure may be understood more readily by reference to the following detailed description taken in connection with the accompanying figures and examples, which form a part of this disclosure. It is to be understood that this disclosure is not limited to the specific products, methods, conditions or parameters described and/or shown herein, and that the terminology used herein is for the purpose of describing particular embodiments by way of example only and is not intended to be limiting of any disclosure. Similarly, any description as to a possible mechanism or mode of action or reason for improvement is meant to be illustrative only, and the disclosure herein is not to be constrained by the correctness or incorrectness of any such suggested mechanism or mode of action or reason for improvement. Throughout this text, it is recognized that the descriptions refer both to methods, and to software and/or hardware for implementing such methods.

A detailed description of illustrative embodiments of the present disclosure will be described with reference to FIGS. 1-15. Although this description provides a detailed example of possible implementations of the present disclosure, it should be noted that these details are intended to be exemplary and in no way delimit the scope of the disclosure.

It is to be appreciated that certain features of the disclosure which are, for clarity, described herein in the context of separate embodiments, may also be provided in combination in a single embodiment. Conversely, various features of the disclosure that are, for brevity, described in the context of a single embodiment, may also be provided separately or in any sub-combination. Further, any references to values stated in ranges include each and every value within that range.

Generally, terms are to be given their plain and ordinary meaning such as understood by those skilled in the art, in the context in which they arise. To avoid any ambiguity, however, several terms are described herein.

It should be appreciated that features may be considered individually or in combination, and that other similar features equally fall within the teachings of this disclosure. Furthermore, it is to be understood that each feature includes all technical equivalents that operate in a similar manner to accomplish a similar purpose.

The Computer Environment

FIG. 1 and the following discussion are intended to provide a brief general description of a suitable computing environment in which the present disclosure and/or portions thereof may be implemented. Although not required, the disclosure is described in the general context of computer-executable instructions, such as program modules, being executed by a computer, such as a client workstation, server, or personal computer. Generally, program modules include routines, programs, objects, components, data structures, and the like, that perform particular tasks or implement particular abstract data types. Moreover, it should be appreciated that the disclosure and/or portions thereof may be practiced with other computer system configurations, including hand-held devices, multi-processor systems, microprocessor-based or programmable consumer electronics, network PCs, minicomputers, mainframe computers, and the like, without limitation. The disclosure may also be practiced in distributed computing environments where tasks are performed by remote processing devices that are linked through a communications network. In a distributed computing environment, program modules may be located in both local and remote memory storage devices.

FIG. 1 is a block diagram representing a general purpose computer system in which aspects of the present disclosure and/or portions thereof may be incorporated. As shown, the exemplary general purpose computing system includes conventional personal computer 120 or the like, including processing unit 121, system memory 122, and system bus 123 that couples various system components including the system memory to processing unit 121. System bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within personal computer 120, such as during start-up, is stored in ROM 124.

Personal computer 120 may further include hard disk drive 127 for reading from and writing to a hard disk (not shown), magnetic disk drive 128 for reading from or writing to a removable magnetic disk 129, and optical disk drive 130 for reading from or writing to a removable optical disk 131 such as a CD-ROM or other optical media. Hard disk drive 127, magnetic disk drive 128, and optical disk drive 130 are connected to system bus 123 by hard disk drive interface 132, magnetic disk drive interface 133, and optical drive interface 134, respectively. The drives and their associated computer-readable media provide non-volatile storage of computer readable instructions, data structures, program modules and other data for personal computer 120.

Although the exemplary environment described herein employs a hard disk, removable magnetic disk 129, and removable optical disk 131, it should be appreciated that other types of computer readable media which can store data that is accessible by a computer may also be used in the exemplary operating environment. Such other types of media include a magnetic cassette, a flash memory card, a digital video or versatile disk, a Bernoulli or other cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as keyboard 140 and pointing device 142. Other input devices (not shown) may include a microphone, joystick, game pad, satellite disk, scanner, or the like, without limitation. These and other input devices are often connected to processing unit 121 through serial port interface 146 that is coupled to the system bus, but may be connected by other interfaces, such as a parallel port, game port, or universal serial bus (USB). Monitor 147 or other type of display device is also connected to system bus 123 via an interface, such as video adapter 148. In addition to monitor 147, a personal computer typically includes other peripheral output devices (not shown), such as speakers and printers. The exemplary system of FIG. 1 also may include host adapter 155, Small Computer System Interface (SCSI) bus 156, and external storage device 162 connected to SCSI bus 156.

Personal computer 120 may operate in a networked environment using logical connections to one or more remote computers, such as remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include local area network (LAN) 151 and wide area network (WAN) 152. Such networking environments are commonplace in offices, enterprise-wide computer networks, intranets, and the Internet.

When used in a LAN networking environment, personal computer 120 is connected to LAN 151 through network interface or adapter 153. When used in a WAN networking environment, personal computer 120 typically includes a modem 154 or other means for establishing communications over the wide area network 152, such as the Internet. Modem 154, which may be internal or external, is connected to system bus 123 via serial port interface 146. In a networked environment, program modules depicted relative to personal computer 120, or portions thereof, may be stored in the remote memory storage device. It will be appreciated that the network connections shown are exemplary and other means of establishing a communications link between the computers may be used.

Computer 120 typically includes a variety of computer readable storage media. Computer readable storage media can be any available media that can be accessed by computer 120 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 120. Combinations of any of the above should also be included within the scope of computer readable media that may be used to store source code for implementing the flow charts described in detail below.

Software Platform and Agent Technology

In view of the computer environment set forth above, the subject matter of the present disclosure pertains to a software service platform that, through the use of server and software agent technology, provides multi-protocol, multi-path connectivity, service, and networking to connected end-point computing devices. For purposes of this disclosure, the term "end-point computing devices" is intended to encompass network-enabled or network-connected technologies that include, by way of non-limiting example, desktop and server computer systems, mobile phones and mobile computing devices, printers, scanners, all-in-one office productivity devices, medical or industrial equipment that is internet protocol capable, and which are able to run basic Java code or are able to transmit data to an agent-enabled neighboring system.

Specifically, the software resource agent of the present disclosure comprises deployable, cross-platform software that can be installed permanently or temporarily to a wide array of computing devices. Acceptable exemplary, but non-limiting, deployment methods are web download, network pull or push of an agent, agentless web/network access, and direct install of an agent via shared storage point, USB, portable mass storage devices, or the like, for local installation.

Once deployed, the agent creates a dynamic, peer overlay network between itself, the deployment of cloud-based platforms, and other permitting software-agent enabled peer devices. Through a web-based or native interface provided by the resource agent, software services from the local device, neighboring resources, and cloud-based resources can be accessed or provided by a wide array of familiar and well-known protocols, such as, for example, one or more of RDP, VNC, SSH, WebDAV, TCP/IP, VPN, and/or HTML.

Agent-enabled resources provide and access resources through peer connectivity directed by a rendezvous agent that publishes and relays peer group information across the network. Rendezvous nodes are created when agents are enabled with a special role that permits them to broadcast and proxy to available network resources. The rendezvous node registers each agent connections and publishes the connection to all permitted resources for that node and for super-nodes. Basic resource information is transmitted in encrypted message bodies that define the status, and the inside and outside address aliases for the agent node. The alias is then used by the rendezvous agent to provide a published connection point to any agent node. In this way, each rendezvous node provides the most effective path or paths for connectivity between the resources.

Cloud-based resources, such as virtual computing machines containing applications, storage, or services, are managed in some embodiments by data center-based platform services. These systems, in some embodiments, may comprise one or more Java application service deployed on one or more application server that provides the ability to dynamically provision users via, for example, one or more of LDAP, PL/SQL, and/or SMB, which are well-known in the art, and connect them to resources inside and/or outside the platform network.

The server platform of the present disclosure provides a code framework that interlinks and delivers an API to virtualization, storage, remote access, and monitoring sub- or other frameworks. The combination of these systems, unified via the API, allows the network to publish, subscribe, and manage resources across multiple platforms and resource agents.

The technology platform of the present disclosure may, in some embodiments, take advantage of known, extant component technologies within, or alongside, its construction and operation. For example, the resource agent, in some embodiments, may include one or more of JAVA, JXTA, JSON, RPC, JavaScript, and HTML/HTML5 technologies, which are well-known in the art. Similarly, multi-connective protocols, wrappers, containers, and/or formats, in some embodiments, may include one or more of PPP-VPN, L2TP-VPN, SSH, SSL, RDP, VNC, FTP, SMB, WebDAV, JRDP, VRDP, AVI, MPEG, WAV, TCP/IP sockets, web sockets, TWAIN, and CUPS technologies, which are well-known in the art.

Similarly, the technology platform of the present disclosure may, in some embodiments, take advantage of known, extant peer networking and remote device access technologies, within, or alongside, its construction and operation. For example, the utilization of virtualization and software-as-a-service, in some embodiments, may employ one or more technology bases such as XEN, KVM, VMware, and VirtualBox, which are well-known in the art. Similarly, network portions of the software platform, in some embodiments, may include one or more of storage and framework technologies such as ZFS, provided by OpenSolaris, which is well-known in the art, in order to provide dynamic resource allocation.

In order to deploy the software platform, the present disclosure may, in some embodiments, make use of one or more of x86 hardware platform, JBoss application server, OpenSSH server, Apache, Tomcat, any of a variety of available SQL database engine, CentOS, Windows (in any of a variety of platforms), OpenIndiana, XenServer, VMware ESXi, KVM, OpenQRM, and Abiquo, which are well-known in the art. In some embodiments, the software platform may be deployed via a relatively simple, software-based switch. Advantageously, whereas prior art solutions are installed and connected into a specific configuration of virtual devices, the present disclosure enables a network which constitutes the basis for the present disclosure to manipulate, dynamically configure, and leverage to perform a wide array of functions.

Turning now to FIGS. 2-15, various additional aspects, details, preferences, and embodiments regarding the subject matter of the present disclosure are described in greater detail.

Figure 2:
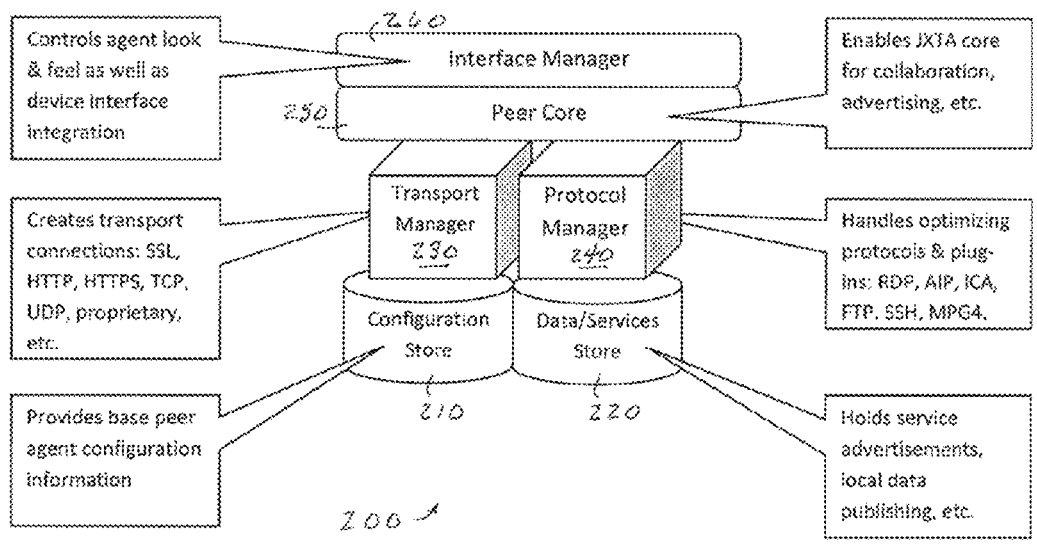
FIG. 2 is a diagrammatic representation of a resource agent peer structure in which the present disclosure and/or portions thereof may be implemented.

FIG. 2 is a diagrammatic representation of a resource agent peer structure 200 in which are provided configuration store 210, data and/or services store 220, transport manager 230, protocol manager 240, peer core 250, and interface manager 260. Within resource agent peer structure 200, configuration store 210 provides base peer agent configuration information to the inventive system. Data and/or services store 220 holds and publishes service advertisements, local data, and the like. Transport manager 230 creates and manages transport connections. Such transport connections may be selected and implemented, as appropriate, from one or more of SSL, HTTP, HTTPS, TCP, UDP, proprietary transport configurations, and the like, without limitation. Protocol manager 240 provides handling and optimization functions for protocols and plug-ins utilized by the system, including, as appropriate, one or more of RDP, AIP, ICA, FTP, SSH, MPG4, and the like, without limitation. Peer core 250 enables JXTA core for collaboration services, advertising of resources, and other interactions with peer computing devices. Interface manager 260 provides control of agent look and feel, as well as device interface integration consistent with the system.

Figure 3:
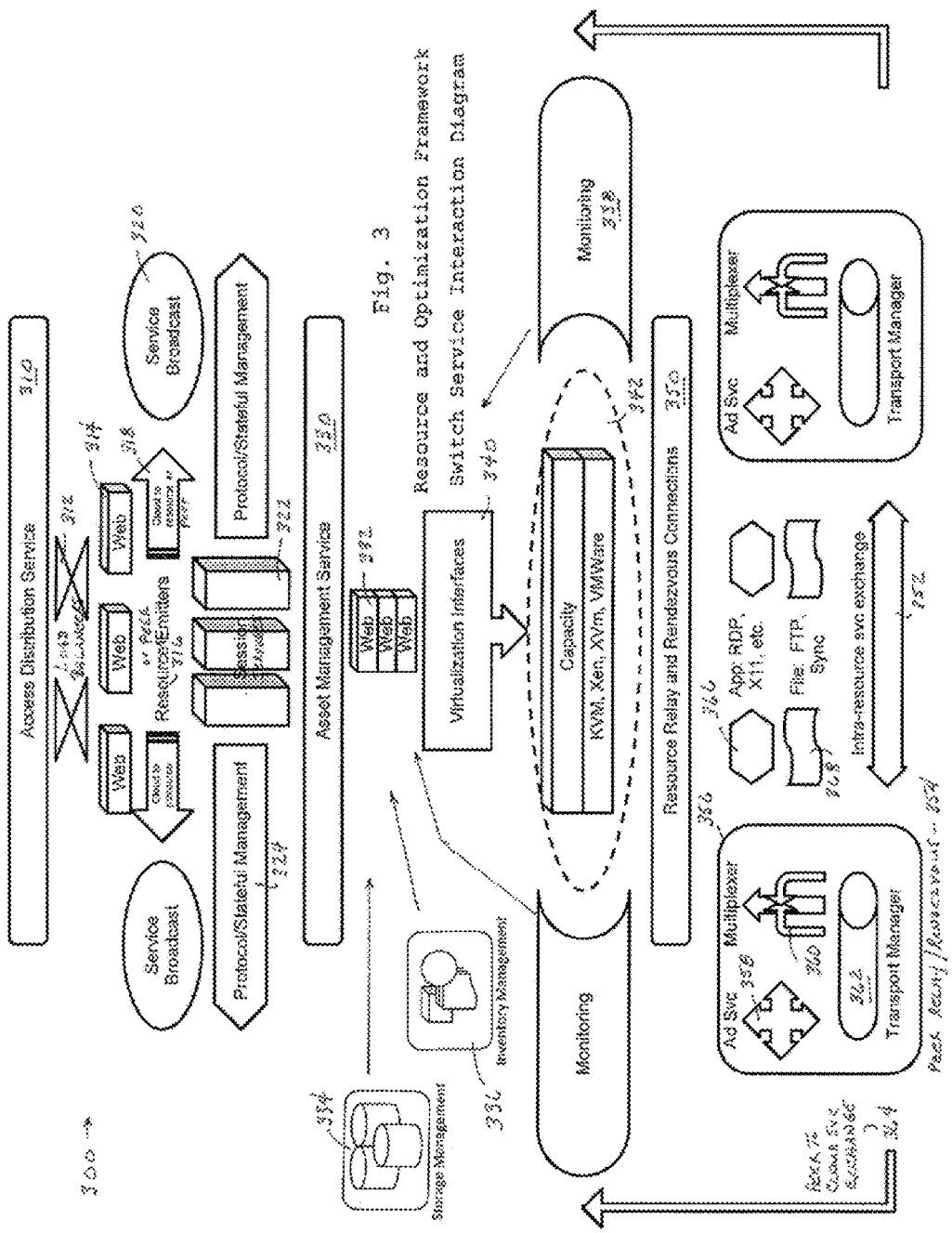
FIG. 3 is a diagrammatic representation of a resource and optimization framework, including switch service interaction, in which the present disclosure and/or portions thereof may be implemented.

FIG. 3 is a diagrammatic representation of a hierarchical resource and optimization framework 300, including switch service interaction functionality, in which are provided access distribution service layer 310, asset management service layer 330, and peer relay and rendezvous nodes layer 350. Access distribution service layer 310 comprises load balancers 312 and web servers 314. Within access distribution service layer 310, peer emitters 316 provide cloud-to-peer 318 service broadcasts 320. Further, session services 322 provide protocol and stateful session management services 324.

Asset management service layer 330 comprises web accessible database 332, interconnected to receive storage management records 334 and inventory management records 336, and to provide monitoring 338 of said records. One or more virtualization interface 340 is provided, and may be selected from any of a variety of readily available virtualization interfaces, and implemented within the system. Appropriate virtualization interfaces are VMware, Xen, XVM, to name a few. Virtualization interface 340 provides system, storage, and processing capacity 342.

Peer relay and rendezvous nodes layer 350 provides for intra-peer service exchange 352 between peer relay and rendezvous agents 354. Peer relay and rendezvous agents 354 establish addressable, interoperable nodes 356. Each node 356 may comprise one or more resource advertising service 358, multiplexer 360, and/or transport manager 230, 362. Each node 356 provides for and supports peer-to-cloud exchange services 364, which interface with access distribution service layer 310 to communicate and exchange data via the Internet. Within peer rely and rendezvous nodes layer 350, interconnected peer resources may securely access and exchange applications 366 and/or files 368. Intra-peer access to applications 366 may be supported, as appropriate, by RDP, ICA, and/or other protocols. Intra-peer file exchanges may be supported, as appropriate, by FTP, Sync, and/or other protocols.

Figure 4:
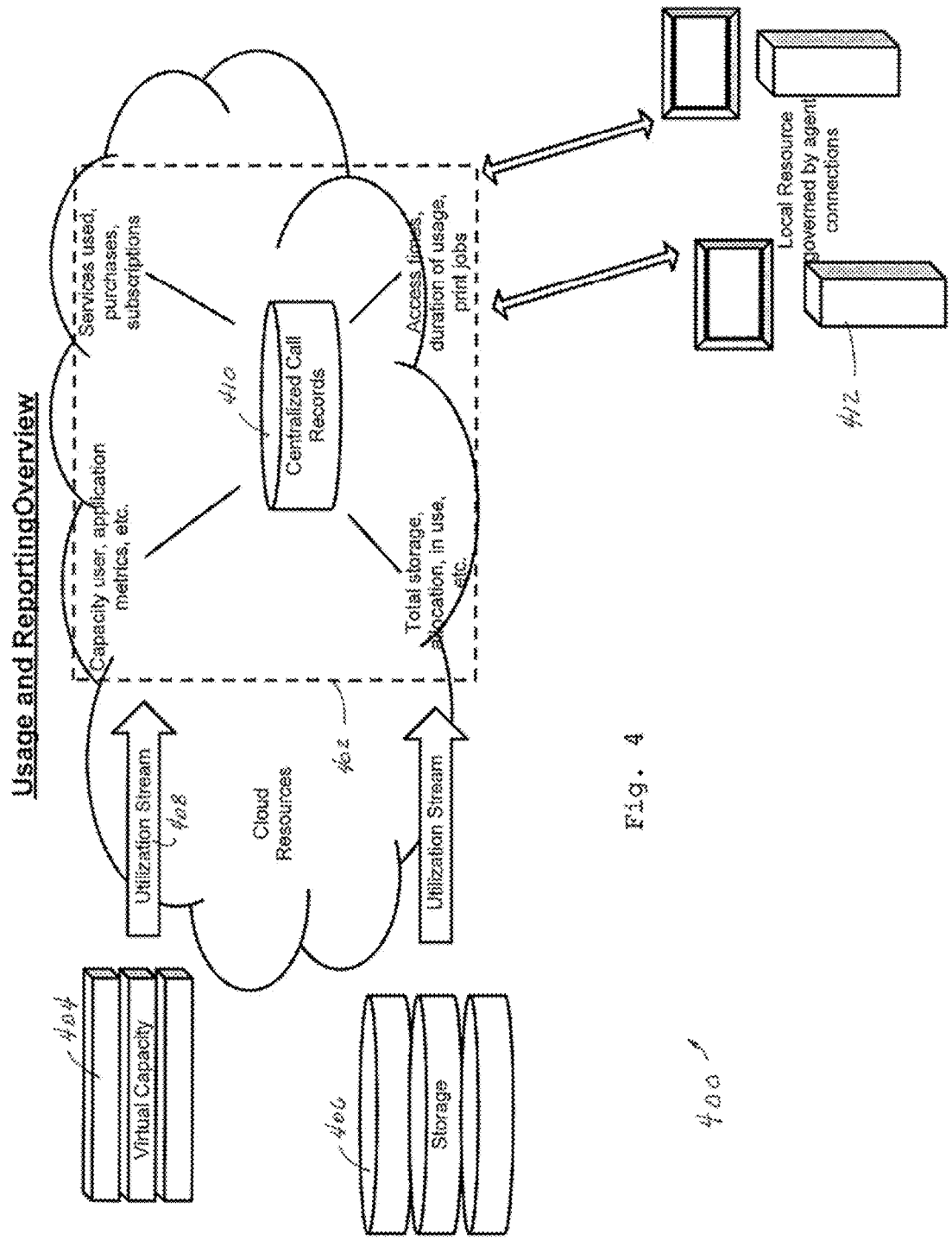
FIG. 4 is a diagrammatic representation of framework usage, utilization, and reporting structure in which the present disclosure and/or portions thereof may be implemented.

FIG. 4 is a diagrammatic representation of framework usage, utilization, and reporting structure 400 of the system of the present disclosure. Within a cloud-based resource structure 402, virtualized capacity resources 404 and cloud-based storage resources 406 are provided through utilization streams 408 to centralized call records database 410. Call records database 410 may provide for storage and manipulation of system-wide data, and for reporting functions. For example, call records database 410 may be configured to provide reports directed to system capacity use, application metrics, or the like. It may be configured to report services utilized, services purchased, subscription status, and the like. Call records database 410 may further be configured to report total storage allocation in use, access times, duration of usage, print jobs, and the like, without limitation. Ultimately, cloud-based resource structure 402 provides for communication and interaction with local resources and devices 412 managed and governed by peer agents of the present system.

Figure 5:
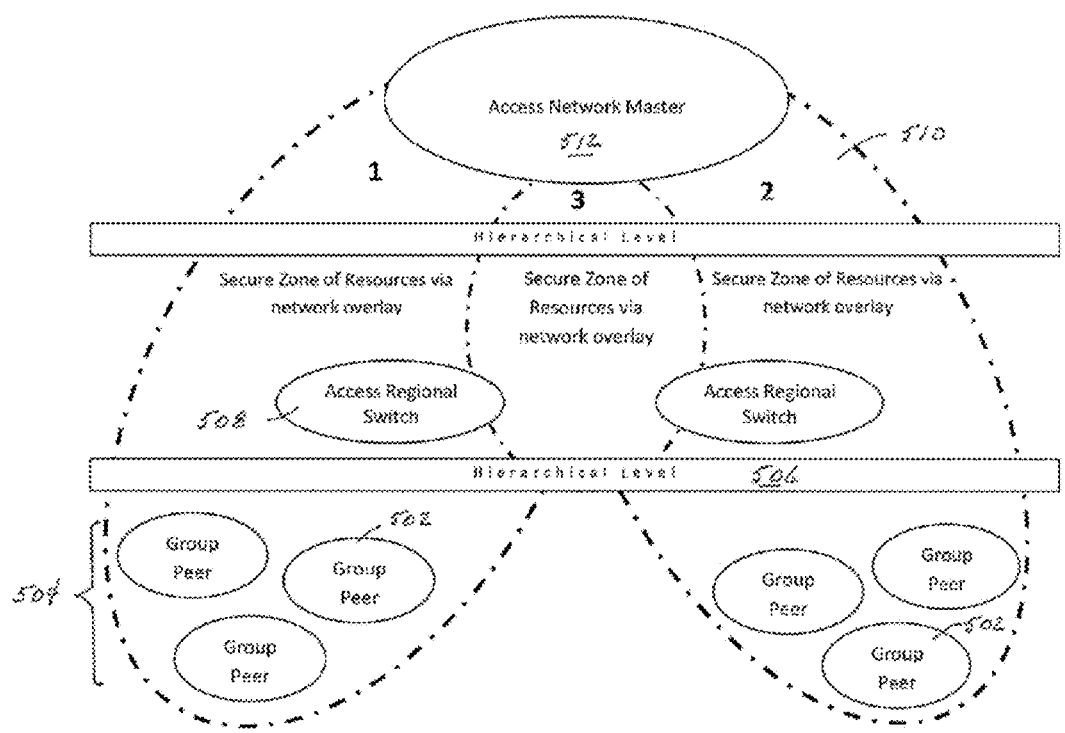
FIG. 5 is a diagrammatic representation of a zoning overlay structure in which the present disclosure and/or portions thereof may be implemented.

FIG. 5 is a diagrammatic representation of a zoning overlay structure 500 in which resources of the system are securely accessed by authorized users. Authorized peers 502 are shown distributed, physically and logically, and sometimes within groups 504, subordinate to hierarchical level 506. Hierarchical level 506 identifies user and resource security definitions and associated configurations, which may be contained within user and/or resource profiles stored in a system database. If appropriate, when a peer 502 calls for a remote resource, hierarchical level 506 passes the request to access regional switch 508. Regional switch 508 passes the resource request from peer 502, through one or more network security overlay zones 510, as appropriate to access the requested remote resource. At all times, access network master security module 512 is configured to oversee and process security requests between peers 502 and various system resources, interacting with network security overlay zones 510 and hierarchical level 506, as described.

Figure 6:
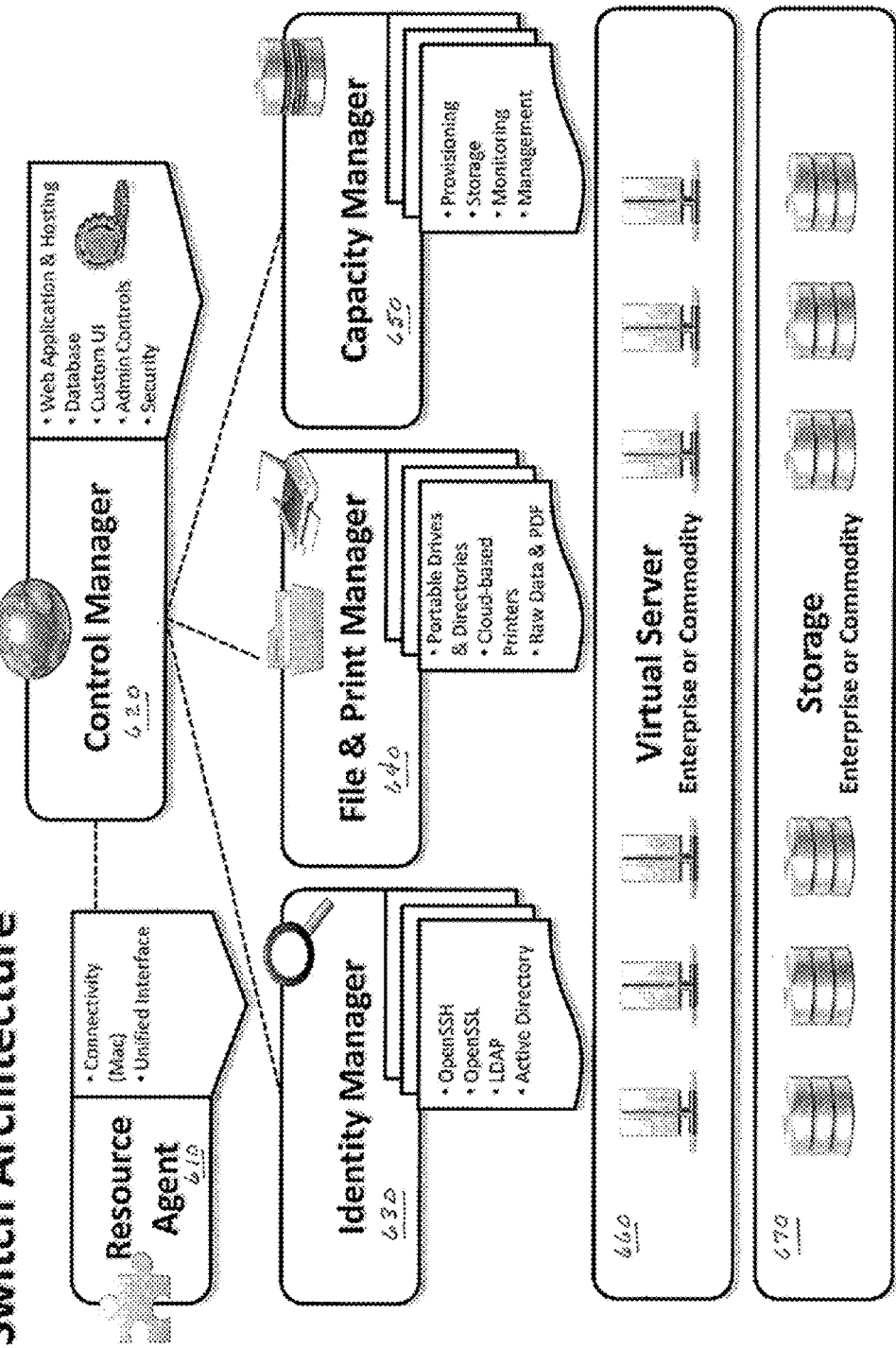
FIG. 6 is a diagrammatic representation of a switch architecture in which the present application and/or portions thereof may be implemented.

Accordingly, depicted in FIG. 6 is a diagrammatic representation of a switch architecture 600 of the present disclosure. Switch architecture 600 includes switch 508, 512 which may be a hardware or software switch. That is to say, the software framework of the present disclosure can be installed onto a specific computing hardware architecture, wherein the hardware architecture and software framework is provided to a customer organization to be operated as a hardware switch or appliance; alternatively, it can be provided to a customer organization to be installed on the organization's existing hardware, wherein it operates as a software switch or appliance.

As best seen with review of FIG. 5, authorized peer 502, such as desktop, laptop, or other user machine, requests access to a remote resource through hierarchical level 506, acting as a first security layer. If authenticated and authorized, the request is passed to switch 508 in switch architecture 600. Switch architecture 600 is seen to comprise one or more of resource agent 610 (also sometimes called a resource manager) and control manager 620. Resource agent 610 provides resource connectivity through a unified interface. Control manager 620 provides access to web application connectivity and hosting, access to databases and database functions, customization of the user interface, administrative controls, and system security.

Interconnected to control manager 620 may be identity manager 630, file and print manager 640, and capacity manager 650. Identity manager 630 provides protocols for interaction across resources associated with the system, and may make use of such exemplary protocols as SSH, SSL, LDAP, and active directory support, to name a few. File and print manager 640 provides access to resources including portable and/or disk drives and other remote storage facilities, cloud-based printers, raw data spoolers, pdf print drivers, and the like. Capacity manager 650 provides provisioning of resources, storage, system and resource monitoring, and management functions. Switch architecture 600 can be utilized in association with enterprise or commodity-based virtual server environment 660. Alternatively, or in addition thereto, switch architecture 600 can be utilized in association with enterprise or commodity-based storage resources.

Figure 7:
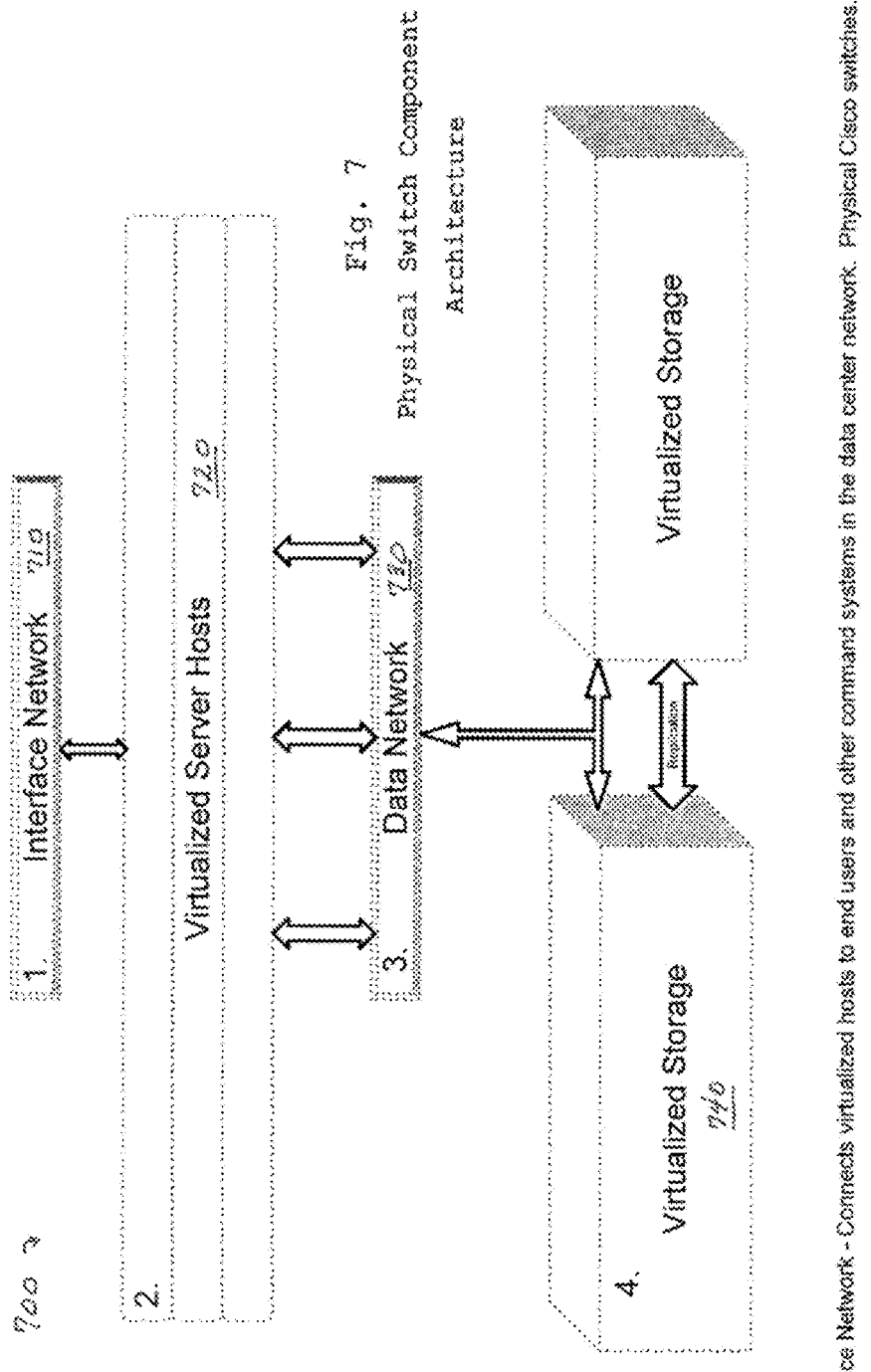
FIG. 7 is a diagrammatic representation of a physical switch component architecture in which the present disclosure and/or portions thereof may be implemented.

FIG. 7 is a diagrammatic representation of a physical switch component architecture 700 which will provide further details regarding hardware aspects of the present disclosure. Physical switch component architecture comprises interface network 710, virtualized server hosts 720, data network 730, and virtualized storage 740. More specifically, interface network 710 connects virtualized hosts to end users and other command systems, via hardware switch, and often within a data center network environment. Appropriate hardware switches might comprise, for example, Cisco® switches. Virtualized server hosts 720 comprise physical servers, such as, for example, Dell® 1950, 2950, and/or 6000 series servers. Virtualized server hosts 720 are layered with appropriate virtualization environments, such as, for example, KVM, Xen, and/or VirtualBox. Data network 730 interconnects dedicated, enterprise level storage to virtualized server hosts 720, and may comprise, for example, high input/output Cisco® switches. Virtualized storage 740 comprises physical storage units which may be configured to run, for example, OpenSolaris in association with a ZFS-based file system. Virtualized storage 740 may be linked to virtualized server hosts 720 to provide storage unit LUN identifiers and storage capacity.

Figure 8:
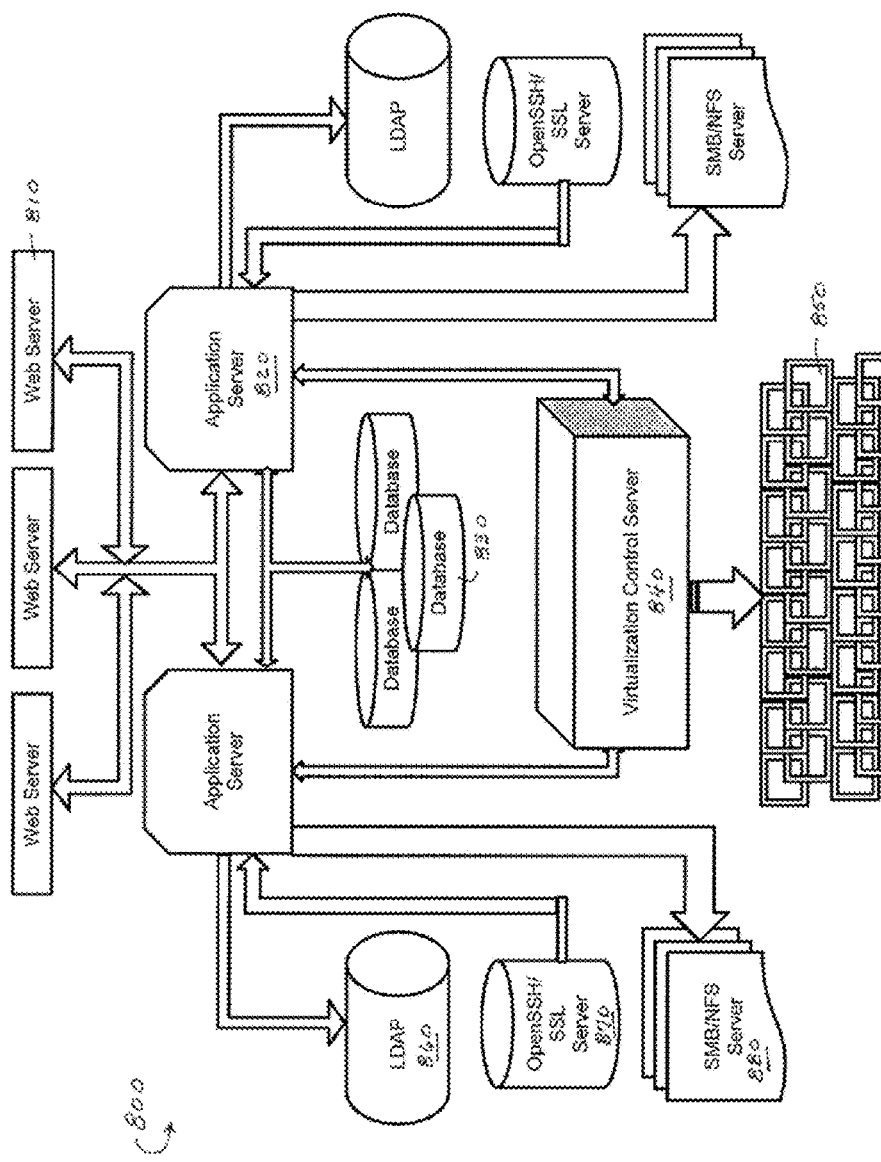
FIG. 8 is a diagrammatic representation of a software switch virtual server architecture in which the present disclosure and/or portions thereof may be implemented.

Turning now to FIG. 8, software switch virtual server component architecture 800 is shown in diagrammatic representation. Within software switch virtual server component architecture 800 is interconnected one or more web server 810, application server 820, database 830, virtualization control server 840, and application host server 850. In order to provide support for interconnectivity of said server environments, software switch virtual server component architecture 800 is further interconnected with one or more LDAP server 860, SSH/SSL server 870, and SMB/NFS server 880. It will be noted that resource agent 610, acting as a super-agent, is configured to control multiple resources within the system infrastructure, and, thereby, acts in association with software switch virtual server component architecture 800 in order to provide secure access to said resources.

FIG. 9 is a diagrammatic representation of web server interaction flow 900. Importantly, web server interaction flow 900 acts, at least in part, to initialize agent functionality. For the below flow, it will be helpful to refer once again to FIGS. 3 and 8. Accordingly, at step 905, a client device request is directed to a published URL. At step 910, a DNS query establishes an IP address for web server cluster 314, such as an Apache web server cluster, and forwards the client device request. At step 915, web server cluster 314 receives the client device request, typically on standard port 80, of load balancer 312. At step 920, a load balance algorithm routes the client device request to the least busy server in web server cluster 314.

Continuing with step 925, a URL parser routes the client device request to a customized index page directed to network resource content. At step 930, the customized index page presents a secure connection across standard HTTPS port 443 and provides an appropriate, corresponding security certificate. At step 935, a conditional process ascertains whether the client device has accepted the security certificate. If so, at step 940 a secure connection to the customized content is established. If not, the process is directed back to step 930 and/or is routed to an error processing step (not shown).

Once a secure connection is established at step 940, processing passes to step 945 where the user is required to log into the system. At step 950, the user's credentials are passed to application server 820, best seen with reference to FIG. 8. See also, FIG. 11 for additional details regarding the application server resource agent load flow. At step 955, application server 820 interrogates LDAP server 860. Following conditional step 960, if LDAP authentication is successful, processing passes to step 965, wherein the client device request is redirected to application server 820 to load the appropriate resource agent 354. If LDAP authentication is unsuccessful, processing passes back to step 955 and/or is routed to an error processing step (not shown). Finally, at step 970, application server 820 establishes primary control, with pass through to web server cluster 314, preferably as a proxy.

At FIG. 10 is provided a diagrammatic representation of a provisioning workflow and component interaction flow

1000. Once again, it will be helpful to refer to FIGS. 3, 6, and 8 in association with FIG. 10. At step 1005, an administrative user accesses switch administration interface of control manager 620 via https connected web console on web server cluster 314. At step 1010, a provisioning request from the administrative user is authenticated to application server 820, which preferably presents a provisioning wizard. At step 1015, application server 820 authenticates administrative credentials in association with LDAP authentication server 860. Role and policy credentials for the administrator are then retrieved.

At step 1020, a provision workflow engine loads asset, resource, and user data from database 830. At step 1025, database 830 further returns records associated with assets, resources, and organizations. At step 1030, the administrative user may review available capacity, for example, through capacity manager 650, to assign or provision further users, resources, or the like. At conditional step 1035, if sufficient capacity is available to be reserved to meet the provisioning requirement, processing passes to step 1055, where capacity is reserved. If sufficient capacity is not available to be reserved to meet the provisioning requirement, processing passes to step 1040, wherein virtualization control server 840 interface 340 is activated. At step 1045, the administrative user may select an appropriate capacity template and act to provision one or more virtual machine or server 342, 660.

Processing next passes to step 1055, where virtualized capacity is reserved. At step 1060, the administrative user may create users and configure user accounts. At step 1065, users are added to LDAP and database records. At step 1070, users are authenticated and bound to SSH/SSL protocol resources. At step 1075, SMB and/or NFS storage may be provisioned to the user and associated organization. At step 1080, users are further associated to capacity that was reserved in step 1055.

At step 1085, available subscriptions are displayed. At step 1090, the administrative user may assign subscriptions to resources and users. At step 1095, newly provisioned users, resources, and subscriptions may be presented to the administrative user for review. At step 1097, newly provisioned users are distributed to the downstream organization, customer, or the like, and provisioned profile records are stored. Finally, at step 1099, provisioning workflow is completed and control is returned to the start.

FIG. 11 is a diagrammatic representation of an application server resource agent load flow 1100. It will be helpful to refer to FIGS. 5, 6, and 8 in association with FIG. 11. It will be instructive to further note that application server resource agent load flow 1100 is applicable to agent-to-agent or agent-to-resource agent requests. Accordingly, at step 1105, an agent connection request is received. At step 1110, a binary store, such as a jar repository, is accessed for allocation of an appropriate resource agent. At step 1115, the client is interrogated to ascertain whether an agent already exists. At conditional step 1120, if the client is confirmed to have an agent already, control passes to step 1130, where an agent command channel connection is established, preferably via SSL. If the client does not have an agent, control passes to step 1125 wherein a resource agent binary is transferred to the client; and whereafter, at step 1130, an agent command channel connection is established, preferably via SSL. At step 1135, agent configuration is transmitted to the resource agent located on the device where the agent is running, for configuration of the agent to the device, and for configuration of the user's role and identity. The resource agent, at step 1140, next loads configuration data and requests connection to remote resources. At step 1145, the resource agent's unique identification key and associated request is validated through the security framework as to authenticity by control manager 620. At step 1150, control manager 620 accesses database 830 to look up the resource agent's unique identification key and associated, available resources. At step 1155, resource configuration data is transmitted to the agent. At step 1160, the agent resource broadcast is received and confirmed. At step 1165, the resource broadcast is published to groups 504. Finally, at step 1170, a listener routine is activated to monitor additional agent service requests.

FIG. 12 is a diagrammatic representation of a resource agent component view structure 1200. Java core framework 1210 may be interconnected to one or more of agent configuration manager 1220, command channel and resource discovery module 1230, security module 1240, protocol control module 1250, file management module 1260, and print control module 1270. It will be understood that such resource agent components are accessible to each device and/or end (fringe) resource.

FIG. 13 is a diagrammatic representation of a resource agent initialization flow 1300. It will be helpful to refer to FIG. 12 in association with FIG. 13. At step 1305, Java Runtime Environment is called to execute core Java framework 1210. At step 1310, core resource files are loaded into memory and configuration files are checked. At step 1315, the agent base configuration is loaded from agent configuration manager 1220. At step 1320, the the last good rendezvous node, group members, and cloud IP address are read. At step 1325, command channel and resource discovery module 1230 is activated. At step 1330, security module 1240 is activated and one or more preferably encrypted security hash table is loaded.

At step 1335, the resource agent is broadcast and published to the resource group and to cloud resources. Subscription and configuration updates are also received. At step 1340, protocol control module 1250 is activated and port redirection via SSH/SSL connection is initiated. At step 1345, security keys are exchanged and validated amongst active resource agents to ensure that only valid and authorized resources are connected. At step 1350 is established a redirected local port to network port link for each associated printer resource. At step 1355 is established a redirected local port to network port link for each associated file share resource. At step 1360, virtual agent status is displayed, along with a desktop for user service interaction. Finally, at step 1365, service activation is established.

FIG. 14 is a diagrammatic representation of a resource agent service initiation flow 1400. Resource agent service initiation flow 1400 is provided for resource activation and publication, and to build resources and publish them for use. It will be helpful to refer to FIG. 12 in association with FIG. 14. Now, at step 1410, protocol control module 1250 is contacted. At step 1420, one or more resource protocol is requested based upon a subscription definition. At step 1430, a service protocol handler, such as, for example, RDP, is loaded. At step 1440, port forwarding is requested from security module 1240. At step 1450, a service connection is activated on the forwarded port using the required protocol handler. At step 1460, resource links are confirmed and authenticated to one or more remote service. At step 1470, local and remote resources are bound, and available printers are published to the remote resource. Finally, at step 1480, the resource session is registered with session service provider 322. This step associates the identity and service of the connecting agent to a registered, unique identifier in the network that is capable of tracking, suspending, and resuming the session state of the secure connection to the appropriate service.

FIG. 15 is a diagrammatic representation of a resource agent print service flow 1500. At step 1505, printer discovery service is initialized. At step 1510, local configuration is read for previously published printers. At step 1515, the agent interrogates the local print service for attached devices. At step 1520, the printer configuration agent list is updated. At step 1525, printer metadata, such as printer name, printer driver definition, and like associated information, are published to the agent group and the primary cloud resources. At step 1530, dedicated print ports are established for each published printer. At step 1535, ports are registered with connected remote services. At step 1540, a remote service acts to transmit raw data to a remote printer queue. At conditional step 1545, a queue request is sent to the agent spooler. If printer resources are available, control passes to step 1555, wherein the agent spooler queues the print job, and subsequently validates and transmits the print job to the local print queue. If printer resources are not available, control passes to step 1550, wherein the print job is held in queue pending printer resource availability and/or or is routed to an error processing step (not shown). Of course, if printer resources timely become available, the print job may be passed at step 1550 back to step 1540 for continued processing in accordance with the aforedescribed flow. Finally, at step 1560, the print job is complete and the resource agent print service is cleared for subsequent printer requests.

Having now provided a detailed disclosure of the present disclosure, certain important differentiators of the present disclosure over known prior art will next be discussed.

Universal Device Access: The resource agent of the present disclosure provides the ability to connect multiple protocols to multiple devices, and then service wrap them so that they are accessible remotely through a cloud-based environment. In this manner, PDA's, EKG devices, printers, and other devices can be enabled so that any group member can utilize the features of the device via one or more subscription. For example, a telemetry gathering device located on premise could be started, stopped, or monitored remotely via the resource agent off-site. A tablet user at a coffee shop could reach the printers located at a specific office branch.

Printing is a subset of this functionality in that local and network printers can all be enabled to be reached from any location. This means that the resource agent effectively creates a SaaS cloud of an organization's registered printers and other devices, making them accessible to and from anywhere in the world, and on a wide array of devices.

Intelligent Protocol Mapping: The resource agent is capable of running multiple unique protocols simultaneously. Additionally, when the resource agent creates services, it intelligently wraps the service protocol with the subscription, so that at run time, a service will run with the most appropriate protocol. For example, launching a Windows® application will automatically invoke the local RDP service from a Windows®-based computing device, while on a Mac or Linux-based device, a Java or HTML 5 version of the protocol will be invoked in order to accommodate the most efficient and appropriate connection. Further, a local service may require cloud connectivity, wherein the agent will create the dynamic redirection necessary to map it securely over the WAN to the cloud.

Software Switch: The framework of the present disclosure is capable of operating as a software switch, wherein a combination of code, resource agents, and virtual machines are linked to form a master node capable of provisioning datacenter level resources, distributing agents, and managing the IT SaaS infrastructure. Such a software switch may be constructed from a set of virtual machines with LDAP, web servers, databases, SMB and other services, linked with resource agents and web application frontend user interfaces. This complete framework of technology is then exported as a virtual appliance, which may be applied to any existing virtual infrastructure. This concept may be taken a step further, wherein a provider may construct the physical servers and storage required, in association with a virtual layer (Xen, KVM, VMWare, Hyper-V, QEMU, etc), and then deploy the previously described software switch. This would constitute a physical appliance, but with the same capabilities as a software switch.

SaaS Enablement and Unification of Resources—Local, Remote and Cloud: The framework and architecture of the present disclosure allows any resource agent-enabled device to service enable its resources. This is more extensive than installing an application in the cloud and publishing it as a service. Rather, the present disclosure can provide a service pointer to a locally installed resource or piece of data. The resource or data never moves, but there now exists a service that allows other users in the group to access it and connect. Additionally, third party SaaS or cloud applications can be augmented to a resource agent group as a subscription, which allows user access to the service through the user's interface.

It has now been demonstrated that the computer system and methods described hereinabove address the aforementioned shortcomings in the prior art and provide a software platform, preferably delivered via the Internet, and an agent architecture, together providing access to and from web-enabled, internet protocol enabled, network-capable and/or network-enabled computing devices with the purpose of delivering and providing software applications, hardware resources, reporting, monitoring, tracking, virtual and cloud computing augmentation, all through a cross-end point, unified, user-based interface. Resources can be connected dynamically to other resources through the platform and, depending upon the decision of the user and the security settings, resources of the end-point device can be provided to other members in the same network. Accordingly, the software platform and agent architecture converge information and technology resources into a dynamic, peer-associated computer network overlay of assets.

It has been further demonstrated that the agent architecture of the present disclosure is unique in its ability to enable a peer-type agent to assume multiple roles and responsibilities. The present disclosure accomplishes this by dynamically adding modules and resources to accommodate requirements. Thus, whereas a resource agent on a typical end point device might have core communication protocols and necessary controls to allow a user to access his or her services and local resources, the present disclosure, uniquely and advantageously, can dynamically promote the agent to be a rendezvous point for the local area. In doing so, services, such as, for example, agent registration, web services, load balancing, and the like, can be added to the existing agent. After assuming these abilities, then, the agent may function at a "higher" level, such as in the role of a rendezvous agent. Further still, a collection of internalized agents leverage virtual server resources of a cloud-based network and form a software switch capable of manipulating the overall cloud resources.

It has still further been demonstrated that the end point agent allows local, remote, and cloud-based services to be accessed from a single interface as though they were one consistent computing platform. The agent can leverage existing technologies on devices, and adapt them for use with the platform. The platform combines multiple technology components into one consistent interface and technology system.

It may now be seen that the software platform of the present disclosure effectively may lower the cost and complexity in deploying and configuring software as a service, virtualization, remote access, device interfacing, communication, security auditing, and information technology resource management.

In addition to the aforedescribed benefits and attributes, the subject matter of the present disclosure provides numerous other benefits over known, existing systems. In addition to being highly device-adaptable, the agent architecture of the present disclosure can integrate new and existing technologies without the need for reinstalling or resource modification. Local device resources can be service-enabled and securely shared directly with other devices through dynamic, user publish and subscribe controls. Features and services can be automatically added to a device interface through the agent architecture, all without the need for complex deployment and configuration management. Additionally, data, application, and user interactions can be accounted for and reported in consolidated views for easy management of services by administrators.

While exemplary embodiments of the disclosure have been described in connection with various computing devices and network architectures, the underlying concepts may be applied to any computing device or system in which it is desirable to implement a software platform and agent architecture that converges information and technology resources into a dynamic, peer-associated computer network overlay of assets. Thus, the methods and systems described in connection with embodiments of the present disclosure may be applied to a variety of applications and devices. While exemplary programming languages, protocols, wrappers, containers, formats, names, and/or examples are chosen herein as representative of various choices, these languages, protocols, wrappers, containers, formats, names, and/or examples are not intended to be limiting. One of ordinary skill in the art will appreciate that there are numerous ways of providing software code that achieves the same, similar, or equivalent systems and methods achieved by embodiments of the present disclosure.

The various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, and/or any other machine-readable storage medium, wherein, when the program code is loaded into and executed by a physical or virtual machine, such as a computer, the machine becomes an apparatus for practicing the disclosure.

While aspects of the present disclosure has been described in connection with the preferred embodiments of the various representative Figures, it is to be understood that other similar embodiments may be used or modifications and additions may be made to the described embodiment for performing the same function of the present disclosure without deviating therefrom. Furthermore, it should be emphasized that a variety of computer platforms, including handheld device operating systems and other application-specific operating systems are contemplated, especially as the number of wireless, networked devices continues to proliferate. Accordingly, the disclosure should not be limited to any single embodiment, but rather should be construed in breadth and scope in accordance with the appended claims.

What is claimed:

1. A system comprising:
   a processing device; and
   a memory device, the memory device comprising
      a service platform configured to
         provide an aggregation point for computing devices to form a hardware-agnostic peer group of computing devices,
         receive a request for access to a remote resource from at least one of the computing devices,
         determine whether each computing device that sends the request for access to a remote resource comprises an end point agent,
         transfer the end point agent to each computing device determined to not have the end point agent, and
         provide a centralized access via an agent command channel connection to each computing device linked to the service platform by an application program interface (API),
      a resource agent configured to establish a multi-directional link from each computing device to another computing device within the hardware-agnostic peer group of computing devices, and
      a control manager configured to utilize the API to provide the hardware-agnostic peer group of computing devices access to web application connectivity and hosting, access to databases and database functions, customization of the API, administrative controls, and system security through one consistent interface for each computing device,
      wherein the service platform, the control manager, and the resource agent together provide at least one remote resource through the API to each computing device.

2. The system of claim 1 wherein the API provides a view of all of the at least one remote resource to each computing device.

3. The system of claim 1 wherein the service platform is deployed as a software-based switch.

4. The system of claim 1 wherein the computing devices are end-point computing devices.

5. The system of claim 1 wherein the resource agent creates a dynamic, peer overlay network between each computing device.

6. The system of claim 1 wherein the resource agent provides access to services from a local device, network resources, and cloud-based resources.

7. A system comprising:
   a plurality of end-point computing devices, each end-point computing device including a resource and configured to send a request for access to a remote resource, wherein at least one of the plurality of end-point computing devices is a different operating system than at least another one of the plurality of end-point computing devices;
   a switch appliance configured to
      receive the request for access to the remote resource from at least one of the plurality of end-point computing devices, determine whether each computing device that sends the request for access to the remote resource comprises a resource agent, transfer the resource agent to each computing device determined to not have the resource agent, provide a hardware-agnostic centralized access to the resources of the plurality of end-point computing devices linked thereto via an agent command channel connection, and provide an application program interface (API) to unify the resources, the API configured to allow publishing, subscribing, and managing resources across a plurality of platforms and the plurality of end-point computing devices through one consistent interface for each computing device; and a rendezvous node configured to publish and to relay peer group information across a network, and further configured to register a resource agent connection for each resource agent and publish a connection point and resource information for all permitted resources, wherein each resource agent allows access to the resources through the API.

8. The system of claim 7, wherein access to the resources of the plurality of end-point computing devices is directed by a rendezvous agent.

9. The system of claim 7, wherein each resource agent includes an interface manager, a peer core, a transport manager, a protocol manager, a configuration manager and a data/services manager.

10. The system of claim 7, wherein the switch appliance includes a resource agent and a control manager.

11. The system of claim 10, wherein the switch appliance further includes an identity manager, file and printer manager, and capacity manager.

12. The system of claim 7, wherein each resource agent includes a java core framework, an agent configuration manager, a command channel and resource discover module, a security module, a protocol control module, a file management module, and a print control module.

13. A non-transitory computer-readable medium comprising computer-executable instructions that, when executed by a computer system, cause the computer system to:

provide an aggregation point for computing devices to form a hardware-agnostic peer group, receive a request for access to a remote resource from at least one of the computing devices, determine whether each computing device that sends the request for access to the remote resource comprises a resource agent, transfer the resource agent to each computing device determined to not have the resource agent, provide a centralized access via an agent command channel connection to each computing device linked to a service platform by an application program interface (API), wherein the resource agent is configured to establish a multi-directional link from each computing device to at least one other computing device within the hardware-agnostic peer group of the computing device;

register a resource agent connection;

publish a connection point and resource information to all permitted resources; and provide at least one remote resource through the API to each computing device, wherein the API provides one consistent interface for each computing device.

14. The system of claim 1, wherein resource information is transmitted by a rendezvous agent in an encrypted message body that defines a status, and an inside and an outside address alias for a rendezvous node.

15. The system of claim 14, wherein the outside address alias is used by the rendezvous agent to provide a connection point to any node.

16. The non-transitory computer-readable medium of claim 13, wherein the API provides a view of all of the at least one remote resource to each computing device.

17. The system of claim 7, wherein the resource information is transmitted in an encrypted message body that defines a status, and an inside and an outside address alias for the rendezvous node.

* * * * *